Figure 1:
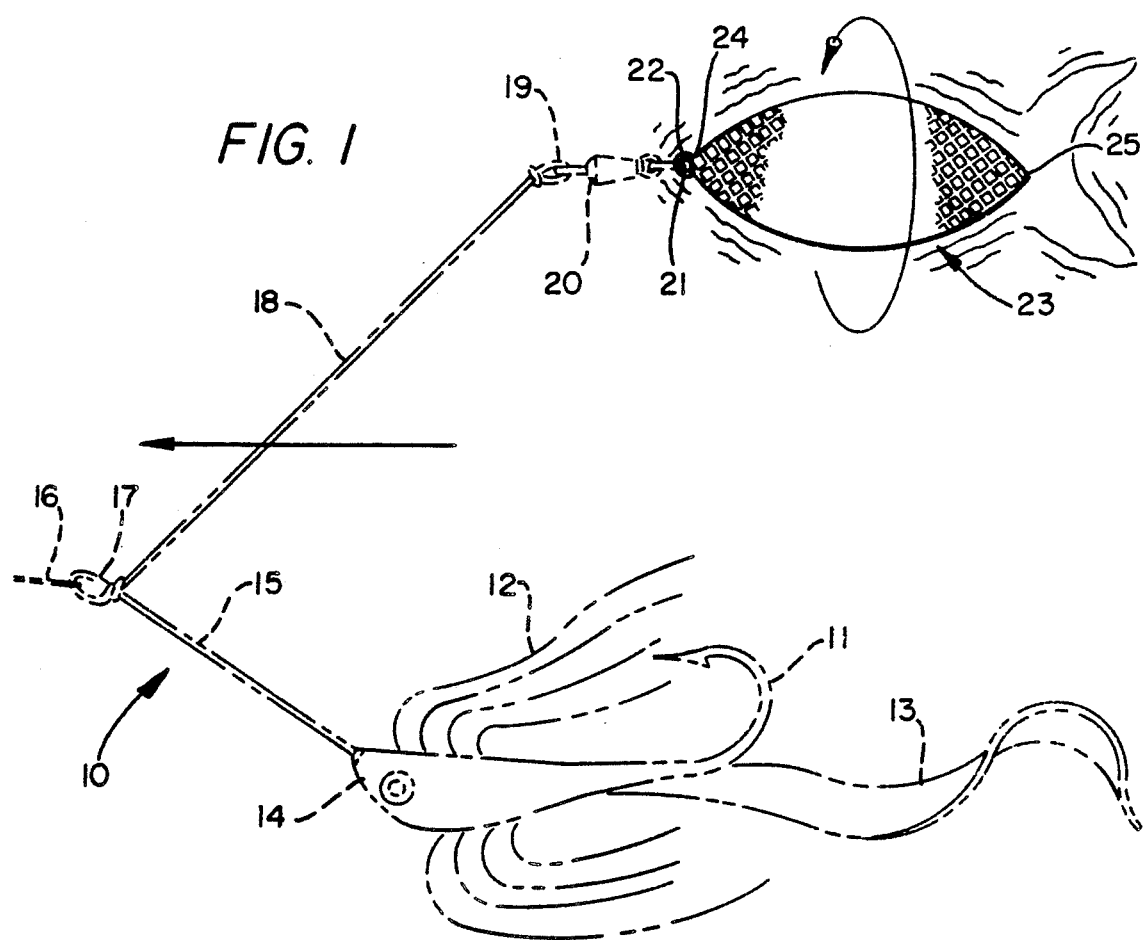

United States Patent [19]

Woodruff et al.

[11] Patent Number: 5,084,996
[45] Date of Patent: Feb. 4, 1992

[54] FISHING LURE LASER SURFACE PATTERN CUT REFLECTIVE PATTERNED SPINNER BLADE

[76] Inventors: Chester G. Woodruff, Rte. 1, Box 42A, Fairmont, Okla. 73736; Bob W. McKinney, Jr., 104 Breckenridge Rd., Enid, Okla. 73701

[21] Appl. No.: 634,539

[22] Filed: Dec. 27, 1990

[51] Int. Cl.⁵ .............................................. A01K 85/01
[52] U.S. Cl. .................................... 43/42.33; 43/42.5
[58] Field of Search ................. 43/42.32, 42.33, 43.34, 43/42.5

[56] References Cited

U.S. PATENT DOCUMENTS

| D. 228,553 | 10/1973 | Sanderson | 43/42.5 |
|---|---|---|---|
| 356,661 | 1/1887 | Pfaff | 43/42.5 |
| 2,657,495 | 11/1953 | Eppinger | 43/42.33 |
| 4,199,888 | 4/1980 | Barnes | 43/42.34 |
| 4,631,854 | 12/1986 | Rosko | 43/42.33 |
| 4,803,793 | 2/1989 | Schellenberg | 43/42.33 |

Primary Examiner—Kurt Rowan
Attorney, Agent, or Firm—Warren H. Kintzinger

[57] ABSTRACT

A twisted spinner blade with laser beam cut surface patterns is provided for use with fishing lures designed to be especially effective in bass fishing. The laser beam cuts that are shallow can have spacing consistent with cuttings running to a much as provided with approximately one hundred forty four thousand pictel cuts per inch. Such laser line surface pattern cuttings intensify reflected light and the cutting area prismatic effect generates a color spectrum reflection and a hologram like image on particles and plankton in the water as it is being moved in a spinning action through the water. This image effect generated around the spinner blade as it is spinning in water while being moved therethrough appears to bass (or other game fish) as a small fish such as a minnow would appear in more visible form.

8 Claims, 2 Drawing Sheets

FISHING LURE LASER SURFACE PATTERN CUT REFLECTIVE PATTERNED SPINNER BLADE

This invention relates in general to fishing lures, and more particularly, to fishing lures especially effective for bass fishing equipped with a twisted spinner blade having laser beam cut surface patterning.

Many bass fishing lures presently on the market are subject to being used in murky water, deep in water and at times in the day when and where there is not much light and the lure is not as visible to bass and other sport fish as desired by the fisherman in attracting fish to the lure. There are hundreds of different lures on the market promising great success for the fisherman with many designed for specific conditions and generally yielding lack luster performance. Thus, the search goes on for the perfect all around bass (or other sport fish) lure, a search undertaken by many dedicated bass fisherman with many driven to even devising their own lures.

It is therefore, a principal object of this invention to provide a lure spinner blade having a generally higher visibility factor than provided with lures heretofore.

Another object is to provide a twisted lure spinner blade that, when turning as it is drawn through water, generates an illusion of a small fish and other attractive baits to game fish.

A further object is to provide a lure spinner blade that generates a sonic throb as it rotates attracting sports fish many times before it is even seen by the fish.

Still another object is to provide such a lure spinner blade at reasonable cost that with laser prismatic line cuts casts holographic images in murky particle and plankton laden water.

Features of this invention useful in accomplishing the above objects include, in a fishing lure laser surface pattern cut reflective patterned spinner blade, a twisted spinner blade with laser beam cut surface patterning over a surface area on at least one side of the blade for use with fishing lures designed to be especially effective in bass fishing. The laser beam cuts that are shallow cuts can have spacing consistent with cuttings running to as much as provided with approximately one hundred forty four thousand pictel cuts per inch. Such laser line surface pattern cuttings intensify reflected light and the cutting area prismatic effect generates a color spectrum reflection and a hologram like image on particles and plankton in the water as it is being moved in a spinning action through the water. This image effect generated around the spinner blades as it is spinning in water while being moved therethrough appears to bass (or other game fish) as a small fish such as a minnow would appear in more visible form.

Specific embodiments representing what are presently regarded as the best modes of carrying out the invention are illustrated in the accompanying drawings.

Figure 2:
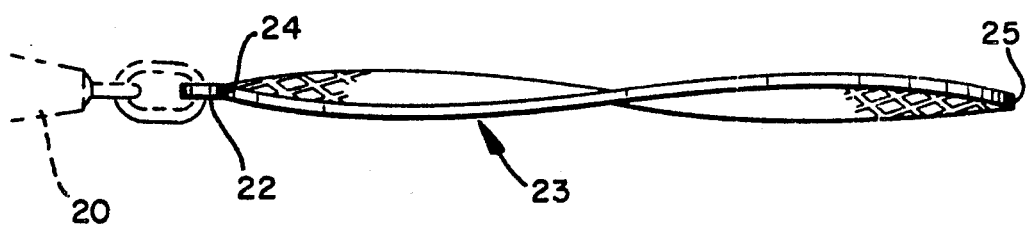
Figure 3:
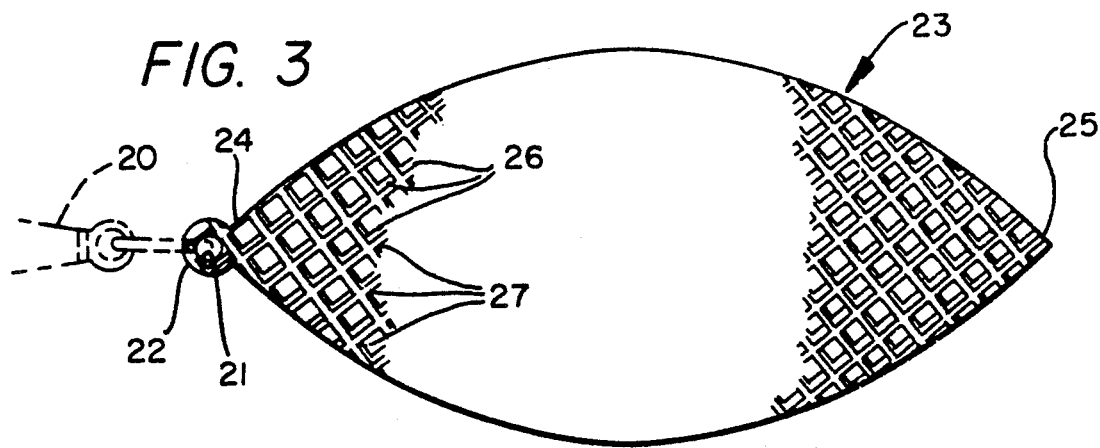
Figure 4:
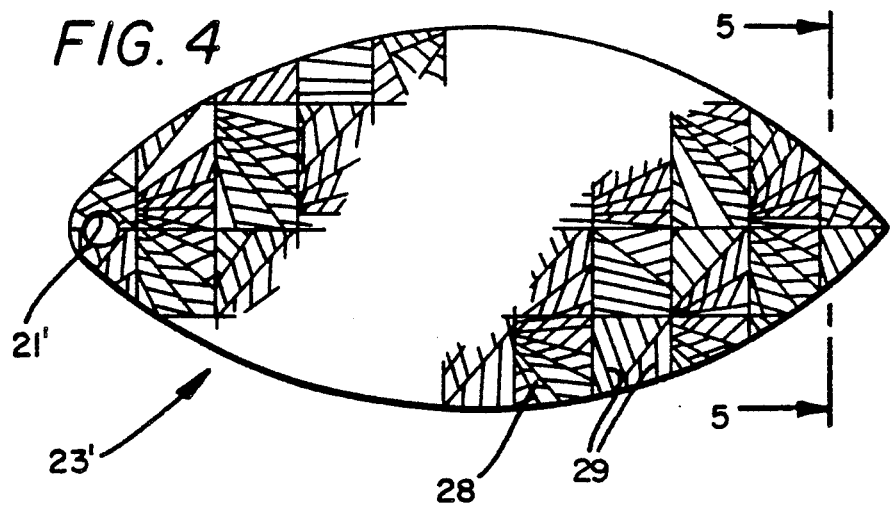
Figure 5:
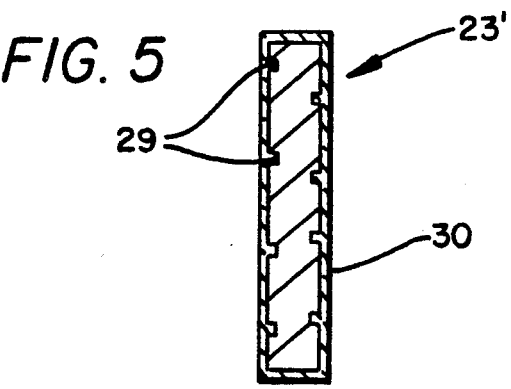

In the drawings:

FIG. 1 represents a combination fishing two branched section lure with a fish hook in one branch and a twisted two sided spinner blade mounted by a universal turn connection to a second branch;

FIG. 2, an enlarged side edge view of the spinner blade of FIG. 1 showing the twist of the blade that induces spinning of the blade as it is pulled through water;

FIG. 3, a side plan view of the spinner blade of FIGS. 1 and 2 illustrating laser cut patterning on the blade;

FIG. 4, a side plan view of another spinner blade from that of FIGS. 1–3 showing another laser cut pattern on a spinner blade; and, FIG. 5, a cut away and sectioned view showing detail of the spinner blade of FIG. 4 with a plastic laminate coating enclosing the blade.

Referring to the drawings:

The fishing lure and hook combination 10 of FIG. 1 is shown to have a fish hook 11 semi hidden in a multifilament skirt 12 and tail 13 of lure 14 fastened to a first wire branch 15 extended from fish line 16 connected wire loop 17. The second wire branch 18 extended from wire loop 17 has an outer end connection loop 19 fastened to universal turn connector 20 in turn fastened through lead end fastening opening 21 projection 22 of spinner blade 23. As shown in FIG. 2 the spinner blade 23 is provided with a moderate twist in the approximate range of approximately five to fifteen degrees from front end 24 to rear end 25 to impart rotation and some flutter movement to the spinner blade 23 as it is pulled through the water or held in place in moving water. The spinner blade 23 that may be stamped (or die cut) from stainless steel (or aluminum sheeting) or made from metal foil coated plastic in thin sheet form has a multiple squared 26 patterend surface with a smaller square (or rectangle) shape 27 in each of the squares 26 of laser parallel cuttings running to a cut spacing attained with cuts up to approximately one hundred forty four thousand pictel cuts per inch. The laser parallel cuttings would run in the approximate range of thirty thousand to one hundred fifty thousand pictel cuts per inch. This laser cut patterning can be provided through an area on one side of the spinner blade 23 or throughout the entire area of both planar sides of the spinner blade 23 such as shown in FIGS. 1–3. As spinner blade 23 turns and flutters as indicated in FIG. 1 with flow by of water the prismatic reflected light to some degree in holographic form on particles and plankton in the water can generate a small fish like image to a game fish in the water.

Referring now to the fishing lure twisted spinner blade 23' with front end fastening opening 21' of FIG. 4 another laser cut pattern 28 is shown as an option to the laser cut pattern on the spinner blade 23 of FIGS. 1–3 that may be more effective under some water and light illumination conditions just as the blade 23 may be more suitable under other water and light conditions. The cut away showing of FIG. 5 has blade 23' thickness to width in exaggerated form and with the extremely small laser cuttings 29 in greatly enlarged exaggerated form and shows the blade 23' to have a plastic laminate coating 30 enclosure. Here again each of the lines shown in FIG. 4 can be hundreds of laser cut closely spaced cuttings yielding the advantageous prismatic colored and holograph reflections desired. Please note that the spinner blades may be provided without plastic laminate coatings determined to some extent by the metal used in the spinner blade 23' or 23.

We want to get those trophy fish and to optimize the chance of them responding to the fisherman's lure.

Whereas this invention has been described with respect to more than one embodiment thereof, it should be realized that various changes may be made without departure from the essential contributions to the art made by the teachings hereof.

We claim:

1. A fishing lure laser surface pattern cut on a twisted spinner blade comprising: a twisted spinner blade with the twist being in the blade body from a forward lure assembly connective end to the rear end of the blade; laser beam pattern cuts on side surface area of said twisted spinner blade that are narrow shallow surface cuts with spacing consistent with cuttings running in the approximate range of thirty thousand to one hundred fifty thousand cuts per inch; said laser line surface pattern cuttings spaced and shaped to intensify reflected light and to present a prismatic effect with the line cuts and density generating a color spectrum reflection on particles and plankton in water as the spinner blade is being moved in its spinning action with passge through the water.

2. The fishing lure laser surface pattern cut twisted spinner blade of claim 1, wherein said laser beam pattern cuts on side surface area of said twisted spinner blade includes pattern cuts on both opposite sides of said twisted spinner blade.

3. The fishing lure laser surface pattern cut twisted spinner blade of claim 1, wherein the twist in said twisted spinner blade from said forward lure assembly connective end to the rear end of the blade is in the range of five to fifteen degrees.

4. The fishing lure laser surface pattern cut twisted spinner blade of claim 3, wherein said laser beam pattern cuts on side surface area of said twisted spinner blade includes a multiple squared cut patterned surface with a smaller rectangular shape in each of the squares of laser parallel cuttings.

5. The fishing lure laser surface pattern cut twisted spinner blade of claim 4, wherein said multiple squared cut patterned surface is extended throughout the area of both sides of said twisted spinner blade.

6. The fishing lure laser surface pattern cut twisted spinner blade of claim 3, wherein said twisted spinner blade is cut from sheet metal.

7. The fishing lure laser surface pattern cut twisted spinner blade of claim 6, wherein said twisted spinner blade includes a plastic laminate coating enclosure.

8. The fishing lure laser surface pattern cut twisted spinner blade of claim 6, wherein said twisted spinner blade is die cut from stainless steel; and said forward lure assembly connective end includes an opening.

* * * * *